(No Model.)

W. HETTERSCHIED.
ADJUSTABLE TABLE.

No. 466,303. Patented Dec. 29, 1891.

Witnesses:
E. L. Boardman
H. Shoemaker

Inventor
William Hetterschied
By Ithiel J. Cilley
Attorney.

UNITED STATES PATENT OFFICE.

WILLIAM HETTERSCHIED, OF GRAND RAPIDS, MICHIGAN.

ADJUSTABLE TABLE.

SPECIFICATION forming part of Letters Patent No. 466,303, dated December 29, 1891.

Application filed September 20, 1890. Serial No. 365,691. (No model.)

*To all whom it may concern:*

Be it known that I, WILLIAM HETTERSCHIED, a citizen of the United States, residing at Grand Rapids, in the county of Kent and State of Michigan, have invented a new and useful Improvement in Adjustable Tables, of which the following is a specification.

My improvements relate to the adjusting appliance and the standard for adjustable tables; and their objects are, first, to facilitate the adjustment of the table to any desired position or height, and, second, to strengthen the adjustable bearings and insure the perfectly free action of its parts. I attain these results by the mechanism illustrated in the accompanying drawings, in which—

Figure 1:
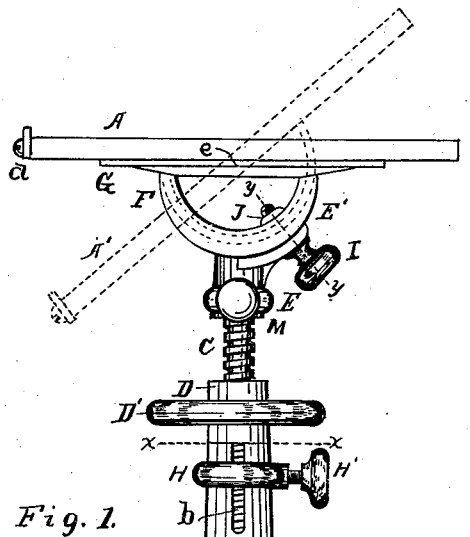
Figure 2:
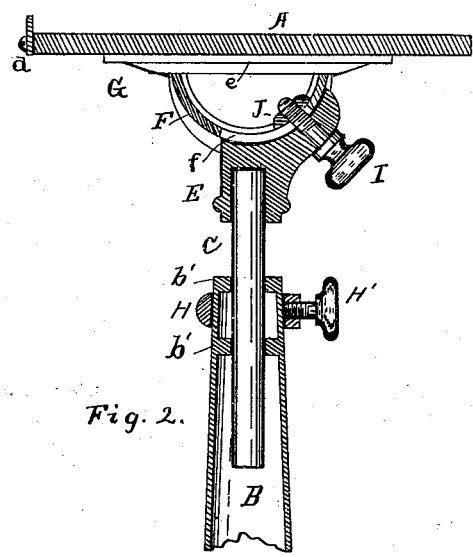
Figure 3:
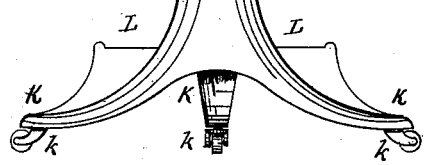
Figure 4:
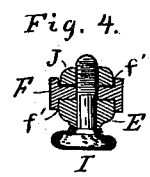
Figure 6:
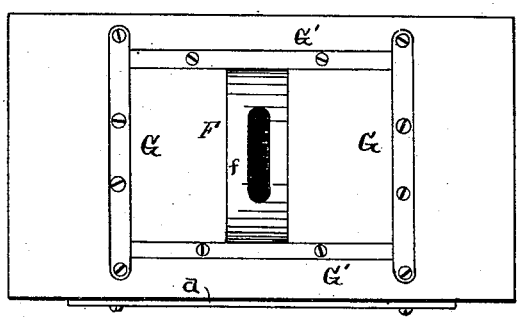
Figure 5:
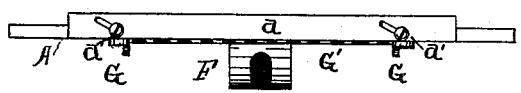

Figure 1 is an elevation of my device. Fig. 2 is a vertical section of the upper portion of the same. Fig. 3 is a cross-section of the standard on the line $x\,x$ of Fig. 1. Fig. 4 is a cross-section of the adjusting arms and nut on the line $y\,y$ of Fig. 1. Fig. 5 is an edge view of the table, and Fig. 6 is a bottom plan of the same.

Similar letters refer to similar parts throughout the several views.

I construct my table-bed A of various sizes and forms and avert the danger of its warping by attaching to its under side heavy metal cleats G, that are connected by girts G', and to these girts I attach a semicircular slide or pivot bearing F, whose center is at $e$ on the lower surface of the table. This slide is made with a web of uniform thickness and provided upon each edge with projecting or T flanges forming bearings $f'$, so that it will slide freely between the nut J and the arm E, and is provided with a slot $f$ that fits upon and works freely over the thumb-screw I.

Upon one edge of the table I place an adjustable stop $a$, that is attached to the table by means of screws $a'$, passing through inclined slots in the stop in such a manner that while the stop may be readily adjusted to any position it will remain in the position it is placed without screwing and unscrewing the set-screws, and the stop may be adjusted to rise above the surface of the table or it may be dropped down level therewith.

I construct the standard B and legs of one continuous piece of metal, (cast-iron,) and provide casters $k$ upon the legs, and upon each leg I cast an upwardly-projecting wing L, designed to be utilized as foot-rests for the operator when standing up to work upon the table. The body of the standard is hollow and provided at its upper end with slots $b$, the walls upon each side of which are designed to be utilized as clamps, to be manipulated by means of the band H and the thumb-screw H', to press upon and hold the shaft C in position. The band H fits loosely around the top of the standard, and the thumb-screw H' is brought to bear against one side of the clamps to force them snugly against the shaft.

The shaft C for the support of my large tables is provided with a screw-thread upon its surface and is manipulated for raising or lowering the table by means of a nut D, that rests upon the top of the standard and is provided with a hand wheel or lever D'; but with my smaller tables I use a plain shaft, as indicated in Fig. 3, and dispensing with the nut and lever I support the shaft entirely by means of the clamps, and to prevent the shaft from tipping to one side I form annular projections $b'$ inside of the standard of a proper size and form to allow the shaft to be freely raised and lowered when the clamp is loosened and to hold it firmly in place when the clamp is secured. I secure a head or arm E to the upper end of the shaft, to one side of which I form an arm E', that projects out and forms a bearing for the support of the pivot-slide F, and I pass a hand or thumb screw I through this and the slide and engage it with a nut J on the opposite side of the slide for the purpose of securing the slide in place. I sometimes secure the head rigidly to the shaft; but usually fit it loosely over the shaft and secure it in place by means of the thumb-screw M, and if I desire to turn my table around without turning the standard it is simply necessary to loosen the thumb-screw and revolve the head upon the shaft.

By using the slide-pivot F E J, I not only insure a free action for the table, but can hold it rigidly in position, no matter at what angle I place it.

Having thus fully described my invention, what I claim as new, and desire to secure, is—

The combination, in an adjustable table, of a standard and a top arranged to admit of vertical and rotary adjustment with a curved slide F, grooved upon its upper and lower surfaces to form sliding surfaces for the nut J and the curved arm E, respectively, and provided with a slot, and a set-screw I, working through the slot and engaging with the nut to fix the table at any desired angle, substantially as and for the purpose set forth.

Signed at Grand Rapids, Michigan, this 16th day of September, A. D. 1890.

WILLIAM HETTERSCHIED.

In presence of—
ITHIEL J. CILLEY,
LOUIS J. SHAFER.